United States Patent [19]

Allgeyer

[11] 3,803,981

[45] Apr. 16, 1974

[54] INDEPENDENT DRIVE SUB-SPINDLE MOUNTED FOR ECCENTRIC ADJUSTMENT IN PRIME SPINDLE

[75] Inventor: Guy Hugo Allgeyer, Toledo, Ohio

[73] Assignee: Owens-Illinois, Inc., Toledo, Ohio

[22] Filed: Jan. 17, 1972

[21] Appl. No.: 218,287

[52] U.S. Cl. ............... 90/15 B, 51/90, 51/241 B, 90/11 A, 408/124
[51] Int. Cl. ........................ B23c 9/00, B24b 5/00
[58] Field of Search... 90/11 A, 15 B; 51/90, 241 B; 29/26; 408/124

[56] References Cited
UNITED STATES PATENTS
2,357,109    8/1944    Heath .................................. 51/90

*Primary Examiner*—Francis S. Husar
*Attorney, Agent, or Firm*—E. J. Holler

[57] ABSTRACT

In the embodiment disclosed herein there is shown a unique sub-spindle assembly which includes means integral with the assembly for driving the sub-spindle. A sub-spindle housing is provided for supporting the sub-spindle and the sub-spindle driving means. The sub-spindle housing has a portion of its outer surface shaped to conform to and mate with a standard tool shank receiving means of a prime machine spindle. A power supply is connected to the sub-spindle driving means from the prime machine spindle by a power conduit means extending from the sub-spindle driving means in the sub-spindle housing, and through the housing to the surface portion of the housing which mates with the tool shank receiving means of the prime machine spindle. The termination of the power conduit means at the housing surface is located to coincide with a power conduit continuation located inside of the prime machine spindle. The sub-spindle housing may further include means enabling the capture and retention of the housing by a prime machine spindle, the capturing means advantageously automatically aligning and connecting the housing power conduit means with a power conduit continuation inside of the prime machine spindle. The sub-spindle may be supported in the sub-spindle housing to align the axis of rotation thereof with an axis of rotation of a prime machine spindle which receives the housing. This permits the sub-spindle to be rotated at speeds dependent only upon the sub-spindle driving means integral with the assembly, or speed variances may be obtained by also rotating the prime machine spindle at the same time that the sub-spindle is being rotated. The sub-spindle may also be supported in the sub-spindle housing with the axis of rotation thereof offset from the axis of rotation of a prime machine spindle receiving the housing. This enables the orbiting of the sub-spindle around the axis of rotation of the prime machine spindle when the prime machine spindle is also rotated.

5 Claims, 1 Drawing Figure

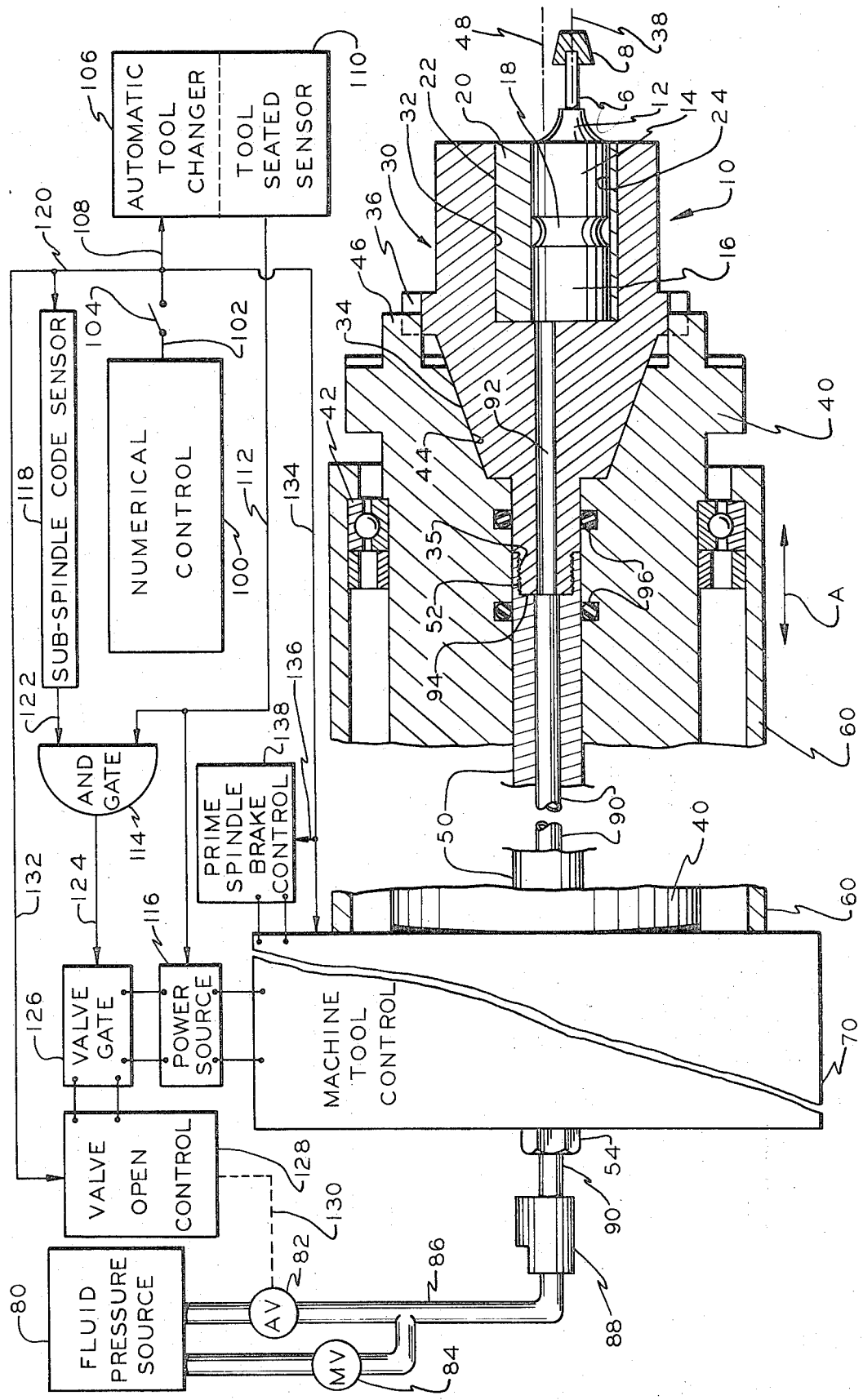

INDEPENDENT DRIVE SUB-SPINDLE MOUNTED FOR ECCENTRIC ADJUSTMENT IN PRIME SPINDLE

BACKGROUND OF THE INVENTION

This invention relates to an integral sub-spindle assembly for driving a cutting tool in a rotary manner when the assembly is connected to a primary spindle of the machine tool.

The need for very high rotary spindle speeds for certain types of small diameter cutting tools, such as metallic carbide burrs and mounted abrasives, usually limits their use to special purpose machine tools. If such high rotary spindle speeds are required for machining or cutting work pieces during a production process, then the work piece must be taken from a standard machining center and relocated so that the special purpose machine tools may operate on the work piece. The relocation of a work piece is a time consuming and costly operation since the work piece must be set up again in a second jig arrangement, usually in a precise manner to enable the machined dimensions to be acquired from the high speed spindle to be coordinated with the dimensions already achieved by the normal heavy duty machining tool where the work piece was originally located.

Since the special purpose machine tools are not normally connected with apparatus having manual or automatic tool changing procedures or provided with numerical control, the higher order finishing operations such as grinding, orbital milling, and the like are frequently performed manually or semi-automatically and thus more slowly and less accurately than numerically controlled machining centers.

If a specially designed sub-spindle arrangement has been provided in the past for connection to a prime machine spindle, in order to obtain the higher cutting speeds desired, the motor individual to and integral with the sub-spindle assembly has been connected to a power source by conduit means which take off from the side of the assembly and trail about the jig holding the work piece, thus interfering with all operations of the machine tool apparatus and actually preventing certain critical operations which require an orbital movement of the higher speed sub-spindle.

Accordingly, it is an object of this invention to provide a new and improved machine tool apparatus.

It is a further object of this invention to provide new and improved machine tool apparatus in which a high speed sub-spindle assembly may be connected to a primary spindle of a machine tool and internally receive power connections from the prime spindle for the sub-spindle drive motor which is integral with the sub-spindle assembly.

It is a still further object of this invention to provide a new and improved sub-spindle assembly which may be utilized in automatic tool changing machining centers.

Another object of this invention is to provide new and improved apparatus for extending the speed ranges and operation capabilities of a standard primary machine tool spindle.

SUMMARY OF THE INVENTION

The above objects of this invention are featured in machine tool apparatus disclosed herein which includes prime spindle means having means for receiving and capturing the shank means of standard machine tools. A sub-spindle assembly is provided which includes a sub-spindle and means for driving the sub-spindle. A sub-spindle housing supports the sub-spindle means and the sub-spindle driving means, and has an outer surface formed with a tool shank configuration which enables the reception and capture of the sub-spindle housing by the prime spindle means.

A power supply is connected to the sub-spindle driving means through a first year conduit which extends from a power supply remote from the sub-spindle assembly and internally through the prime spindle means to an interface between the tool shank receiving surface of the prime spindle and the sub-spindle housing means. A second power conduit extends from the sub-spindle driving means through the sub-spindle housing to the interface between the shank configuration of the housing and the prime spindle. Means are provided for connecting the first and second power conduit means at the interface.

The first and second power conduits may be automatically connected by a means for capturing the shank configuration of the sub-spindle assembly. Means are also provided which are responsive to the seating of the sub-spindle housing in the prime spindle means for enabling the supply of power via the first and second conduits to the sub-spindle driving means. Means may also be supplied which is responsive to the absence of the sub-spindle housing means in the prime spindle receiving means for preventing the supply of power to the first conduit.

The sub-spindle driving means is responsive to power received via the first and second power conduits to rotate the sub-spindle at speeds in excess of the rotary speeds available for the prime spindle. Rotation of the prime spindle may be prevented to enable the machining to be accomplished by the sub-spindle assembly alone. Means are provided for regulating the speed and the amount of power supplied to the sub-spindle driving means.

The sub-spindle may be supported in the sub-spindle housing to align the axis of rotation thereof in coincidence with the axis of rotation of the prime spindle. Thus the prime spindle may be rotated while the sub-spindle is being rotated, thereby enabling a variance of speed of a machining surface of a tool held in the sub-spindle assembly from that supplied individually by either the prime spindle or the sub-spindle.

The sub-spindle may be supported in the sub-spindle housing with the axis of rotation thereof offset from the axis of rotation of the prime spindle means. The prime spindle means may then be rotated to orbit the axis of rotation of the sub-spindle about the axis of rotation of the prime spindle.

In the particular embodiment shown herein the prime spindle means for capturing the shank configuration of the sub-spindle assembly includes drawbar means extending through the prime spindle means. The first power conduit means is then advantageously extended coaxially along and inside of the drawbar means. A rotary coupling means may be connected to the end of the first power conduit which is remote from the sub-spindle assembly to transfer power to the first power conduit from a remote power source or supply without interfering with machining operations.

The first and second power conduit means in the embodiment shown herein includes fluid carrying passageways. The first and second power conduit means are connected by joining the passageway means of the first and second power conduit means to establish fluid flow communication between the two passageway means. A fluid seal is advantageously provided adjacent the joined passageways to prevent fluid leakage.

Other objects, features and advantages will become apparent from the following description taken in conjunction with the accompanying drawing, in which a cross-sectional view of the unique sub-spindle assembly and a prime machine spindle is shown in association with schematically represented components illustrating the teachings of this invention.

DESCRIPTION OF THE PREFERRED EMBODIMENT

Referring to the drawing there is illustrated a shank 6 of a high speed cutting tool 8 engaged in a sub-spindle 12 of a sub-spindle assembly generally indicated at 10. The sub-spindle 12 is connected to be rotated by a gear train 14, which, in turn, is driven by a sub-spindle motor 16, all advantageously contained in an integral sub-spindle power capsule 18.

The axis of rotation 38 of the sub-spindle may be located with respect to the axis 48 of a prime machine spindle by selectively positioning the power capsule 18 in the sub-spindle housing 30. A bore 32 is formed in the housing 30 having a diameter which will receive and hold a bushing 20 having an outer diameter substantially identical to the inner diameter of the bore 32. The bushing 20 is provided with an internal opening or bore 24 which has the same diameter as the power capsule 18. The location of the internal bore 24 of the bushing 20 determines the positioning of the axis of rotation 38 of the sub-spindle 12. The center of the inner bore 24 of bushing 20 is shown in the drawing as offset from the center of the bore 32 formed in the housing 30. Thus, the axis of rotation 38 is offset from the axis of rotation 48 of the prime spindle. If the prime spindle 40 is rotated while the sub-spindle assembly 10 is inserted therein, the sub-spindle 12 and the cutting tool 8 will be orbited about the axis of rotation 48 of the prime machine spindle.

Different positions for the axis of rotation 38 of the sub-spindle 12 may be achieved by selecting bushings 20 in which the central bore therein is located in different positions with respect to the axis of rotation 48 of the prime spindle. One of the preferred positions that may be selected is that in which the saxis of rotation 38 of the sub-spindle 12 is coincident with the axis of rotation 48 of the prime spindle 40.

The sub-spindle housing 30 has a portion of the surface thereof formed into a standard tool shank configuration as indicated at 34. The tool shank configuration which is selected for that outer surface 34 of the sub-spindle housing will depend upon which one of the standard tool shank configurations which is formed in the prime spindle 40. It may be possible to use adapters to achieve interconnection. The housing 30 may further have slots 36 formed therein to receive pins 46 extending from the prime spindle 40 to prevent rotation of the sub-spindle assembly 10 with respect to the prime spindle 40.

In this embodiment the prime spindle 40 is supported for rotation in bearing means 42 held in a reciprocably movable quill element 60, the direction of movement of the quill 60 indicated by the double-headed arrow A.

The quill 60 and the prime spindle 40 are connected to a machine control and drive means 70. Such controls and drives for quills and prime spindles are known in the art and need not be described in detail here. It should be noted that, although the prime and subspindles are shown as being operated herein in a horizontal position, the principles of this invention are applicable to vertically operated spindles and to spindles operated at an angle with respect to the vertical.

The sub-spindle assembly 10 is connected to the prime spindle 40 by a tool drawbar 50. The tool drawbar 50 has a threaded end 52 which mates with a threaded end 35 of the housing 30 of the sub-spindle assembly 10. The tool drawbar 50 may be rotated, as by the manual rotation nut shown at 54, or by power operated rotating means known to those skilled in the art which secures the threaded portions of a drawbar and a tool shank together with a preferred amount of rotational torque.

A fluid pressure source is indicated at 80 for supplying fluid under pressure to drive the motor 16 in the sub-spindle assembly, if the motor 16 is to be fluid driven. Fluid under pressure is supplied from source 80 via one of the valves 82 and 84, connected in parallel to a conduit 86. The valve 82 automatically controls the amount of fluid pressure available, as will be explained in greater detail hereinafter, while the valve 84 permits manual control of the speed and power supplied to the motor 16. The conduit 86 supplies fluid through a rotary coupling 88 to a conduit 90 which is located internally and extends coaxially within the drawbar 50. The passageway in the conduit 90 is connected to a passageway 92 formed in the sub-spindle housing 30 between the motor 16 and the interface 94 between the machine tool drawbar 50 of the machine spindle 40 and the sub-spindle housing 30 to establish fluid flow communication therebetween. Fluid seal means 96, shown in the form of O-rings, may be provided on each side of and adjacent to the passageway connection to prevent fluid leakage when the passageway in conduit 90 is not perfectly abutted or aligned with passageway 92 in housing 30.

A numerical control unit is designated at 100 and, as well known in the art, may supply signals for automatic operation of a machining center via a lead 102 and a disabling switch 104, the switch 104 enabling interruption of automatic operation of the apparatus. A lead 108 directs signals from the numerical control 100 to an automatic tool changer 106. Automatic tool changers are also known in the art and include transfer mechanisms for selecting predetermined tools, from a magazine containing a variety of tools, in response to signals received from the numerical control 100. The tool selected from the magazine is transferred to the prime machine spindle 40 while a tool previously in the prime machine spindle 40 is returned to the magazine. The automatic tool changer may contain a tool-seated sensor section 110 which senses the seating and connection of a machine tool to the prime spindle 40 and provides a signal indicating the seating and connection thereof on lead 112. Alternatively, such a signal may be provided by the means associated with the prime spindle 40 for capturing and connecting a tool shank to the prime spindle. The signal on lead 112 may be utilized to gate or enable connection of a power source 116 to the machine control and drive unit 70, to permit the machine tool apparatus to perform the functions prescribed therefor by the numerical control 100 along a lead 134 connected between the control 100 and the machine control and drive 70.

It should be noted that only a single output lead has been shown from the numerical control unit 100 for the purpose of simplicity in schematically depicting the operation thereof. But the single lead output is representative of a plurality of leads with different signals, or of encoding and decoding devices associated with the various components which enable acceptance or rejection of signals intended only for a particular component.

A sub-spindle code sensor unit 112 may be provided which, in response to a signal from the numerical control unit 100 to the automatic tool changer 106 to select the sub-spindle assembly 10 from a magazine provides an output signal on lead 122 to one input of an AND gate 114. When there is a coincidence of inputs on that lead 122 and the lead 112 from the tool-seated sensor 110 indicating that the sub-spindle assembly 10 is in place, the AND gate 114 will provide an output on lead 124 to a valve-gate unit 126. The valve-gate unit 126 in response to a signal from the AND gate 114 may be set up to connect the power source 116 directly to the valve 82 when it is of the solenoid operated type. This type of connection will open the valve all the way or permit the valve to be all the way closed. Thus, only one speed would be obtainable for the sub-spindle motor 16.

It is desirable to be able to regulate the speed of the sub-spindle 12 over a predetermined range. Therefore, a valve opening control 128 has been provided intermediate the valve-gate control 126 and the automatic valve 82. The valve-gate unit 126 supplies power to the valve opening control 128 in response to a signal from the AND gate 114. A signal is provided on lead 132 from the numerical control 100 to the valve open control unit 128 to tell the motor or other driving device in unit 128 how long to run. A mechanical linkage 130 between the valve open control 128 and the automatic valve 82 enables the control unit 128 to open the valle 82 to a position in a predetermined range of positions to obtain a desired operating speed and power supply for the motor 16 to drive the sub-spindle 12.

A signal may also be provided from the numerical control 100 via lead 134 to instruct the machine control 70 as to the action required for a particular machining operation. The signal on lead 134 may also be utilized via lead 136 to cause a prime spindle brake control unit to hold the prime spindle 40 against rotation during rotation of the sub-spindle 12, or to release the prime spindle 40 and enable rotation thereof at a speed determined by the numerical control 100.

There has thus been described a sub-spindle arrangement or assembly which may be utilized with a primary spindle of a machine tool to obtain very high rotary spindle speeds for certain types of cutting tools such as metallic carbide burrs and mounted abrasives. The high rotational speed sub-spindle can be interchanged in a standard prime spindle of a machine tool manually, or automatically interchanged with other tool units in an automatic tool changing machining center.

The sub-spindle assembly has been provided with an industry standardized tool shank to enable engagement with a standard prime spindle 40, but is individually driven by an integral motor, which may be hydraulic, pneumatic electric or other separately powered device, which device advantageously has remote control access to the speed, the power and the on-off control for the separately powered sub-spindle drive.

By internal connections made coincidentally during the insertion of the sub-spindle assembly into a machine tool prime spindle, power to drive the sub-spindle is provided. The prime machine spindle thus becomes the positioning and guiding means for the higher speed sub-spindle and its tools, and can be locked in a non-rotating mode or can be rotated at the same time to obtain special machining effects.

This invention thus enables the extension of the range of flexibility and versatility of machining centers having manual or automatic tool changing procedures, into the higher order finishing operations such as grinding, orbital milling, and the like, without the necessity of relocating work pieces needing requiring higher order material removal operations. The invention has also enabled the provision of jig grinding procedures to an otherwise conventional machine tool spindle. By off-setting the sub-spindle axis of rotation from the prime spindle adapter center line the desired amount for a given situation, rotation of the machine tool prime spindle at a suitable low speed will orbit the sub-spindle axis about the prime spindle axis, thus enabling the circular internal or external periphery of a work piece to be machined by the tool mounted in the sub-spindle.

The speed range of the machining center may be extended since the sub-spindle assembly has its own integral and individually driven motor which may be operated at speeds in excess of those available for the prime spindle. As noted hereinbefore, if the axis of rotation of the sub-spindle is coincident with the axis of rotation of the prime machine spindle, then by rotating both spindles at once the speeds of the two spindles may be added to or subtracted from each other, depending upon the relative directions of rotation, to provide a speed for the machine tool surface in the sub-spindle which would not be available individually from either the prime spindle or the sub-spindle.

While the motor 16 illustrated in the drawing has been described as a pneumatic motor in which air under pressure need only be supplied in one direction to the motor and then exhausted into the ambient atmosphere, it is to be noted that other types of motors may be utilized and are considered equivalent in this apparatus. For example, a hydraulic motor may be utilized for the driving means 16 and would preferably have both a supply and a return passageway to connect hydraulic fluid being pumped under pressure to the motor. The supply and return passageways may be located coaxially with each other within the prime spindle, and in this case in the drawbar, in a manner known to those skilled in the art for connection between the motor and the rotary coupling 88. Two conduits may be required from the rotary coupling 88 to the source for circulating the hydraulic fluids under pressure, depending upon the particular type of rotary coupling utilized.

Similarly, an electric motor may be utilized in which an electric power conduit may be provided in the passageway in the housing of the sub-spindle assembly for connection by known means to an electric power conduit located coaxially within the drawbar 50. Electrical slip rings in the rotary power coupling 88 may then provide a connection for an external electrical power source to the cables or electric conduits within the prime machine spindle to an electric motor located in the sub-spindle assembly.

While there have been shown and described and pointed out the fundamental novel features of this invention with reference to the preferred embodiment thereof, those skilled in the art will recognize that various changes, substitutions, omissions and modifications in the structures described may be made by those skilled in the art without departing from the spirit of the invention.

I claim:

1. Machine tool apparatus, comprising
   a. prime spindle means including means for receiving and capturing shank means of machine tools;
   b. sub-spindle means and means for driving said sub-spindle means;
   c. housing means for supporting said sub-spindle means and said sub-spindle driving means, said housing means having a shank configuration enabling the reception and capture of said housing by said prime spindle means; and
   d. means for connecting a power supply to said sub-spindle driving means including first power conduit means extending from a power supply and internally through said prime spindle means to an interface between said shank receiving means and said sub-spindle housing means, second power conduit means extending from said sub-spindle driving means through said sub-spindle housing means to said interface between said shank configuration of said housing means and said prime spindle means, and means for connecting said first and second power conduit means at said interface, said means for connecting said first and second power conduit means at said interface being part of and automatically enabled by said means for capturing shank means.

2. Machine tool apparatus, comprising
   a. prime spindle means including means for receiving and capturing shank means of machine tools;
   b. sub-spindle means and means for driving said sub-spindle means;
   c. housing means for supporting said sub-spindle means and said sub-spindle driving means, said housing means having a shank configuration enabling the reception and capture of said housing by said prime spindle means; and
   d. means for connecting a power supply to said sub-spindle driving means including first power conduit means extending from a power supply and internally through said prime spindle means to an interface between said shank receiving means and said sub-spindle housing means, second power conduit means extending from said sub-spindle driving means through said sub-spindle housing means to said interface between said shank configuration of said housing means and said prime spindle means, and means for connecting said first and second power conduit means at said interface, said means for connecting said first and second power conduit means being responsive to the activation of said means for capturing shank means.

3. Machine tool apparatus comprising
   a. prime spindle means including means for receiving and capturing shank means of machine tools;
   b. sub-spindle means and means for driving said sub-spindle means;
   c. housing means for supporting said sub-spindle means and said sub-spindle driving means, said housing means having a shank configuration enabling the reception and capture of said housing by said prime spindle means; and
   d. means for connecting a power supply to said sub-spindle driving means including first power conduit means extending from a power supply and internally through said prime spindle means to an interface between said shank receiving means and said sub-spindle housing means, second power conduit means extending from said sub-spindle driving means through said sub-spindle housing means to said interface between said shank configuration of said housing means and said prime spindle means, and means for connecting said first and second power conduit means at said interface, said prime spindle means for capturing shank means including drawbar means extending through said prime spindle means, said first power conduit means extending coaxially along and inside of said drawbar means.

4. Apparatus as defined in claim 3 in which said means for connecting a power supply to said sub-spindle means further includes rotary coupling means connected to an end of said first power conduit means opposite to the end of said first power conduit means which is to be connected to said second conduit means.

5. Machine tool apparatus, comprising
   a. sub-spindle means and means for driving said sub-spindle means;
   b. housing means for supporting said sub-spindle means and said sub-spindle driving means, said housing means having a portion of its outer surface shaped to conform to and mate with a tool shank receiving means of a prime machine spindle; and
   c. means for connecting a power supply to said sub-spindle driving means from a prime spindle means including a power conduit means extending from said sub-spindle driving means in said housing means and through said housing means to said surface portion of said housing means which mates with a shank receiving means of a prime machine spindle, the termination of said housing power conduit means at said housing surface being located to coincide with a power conduit continuation inside of a prime machine spindle;
   d. said housing means further including means enabling the capture and retention of said housing means by a prime machine spindle;
   e. said capture enabling means including means for automatically aligning and connecting said housing power conduit means with a power conduit continuation inside of a prime machine spindle.

* * * * *